United States Patent
Wang et al.

(10) Patent No.: US 10,178,686 B2
(45) Date of Patent: Jan. 8, 2019

(54) INCREASED NETWORK THROUGHPUT WITH CCA LEVEL ENHANCEMENT

(71) Applicant: MEDIATEK Singapore Pte. Ltd., Singapore (SG)

(72) Inventors: James June-Ming Wang, San Marino, CA (US); Jianhan Liu, San Jose, CA (US); YungPing Hsu, Taipei (TW)

(73) Assignee: MEDIATEK Singapore Pte. Ltd., Singapore (SG)

( * ) Notice: Subject to any disclaimer, the term of this patent is extended or adjusted under 35 U.S.C. 154(b) by 172 days.

(21) Appl. No.: 14/998,126

(22) Filed: Dec. 24, 2015

(65) Prior Publication Data

US 2016/0157264 A1    Jun. 2, 2016

Related U.S. Application Data

(63) Continuation of application No. PCT/US2014/043744, filed on Jun. 24, 2014.

(51) Int. Cl.
  *H04W 72/12* (2009.01)
  *H04W 74/08* (2009.01)

(52) U.S. Cl.
  CPC ... *H04W 72/1257* (2013.01); *H04W 74/0808* (2013.01)

(58) Field of Classification Search
  CPC .............. H04W 72/1257; H04W 74/0808
  See application file for complete search history.

(56) References Cited

U.S. PATENT DOCUMENTS

| | | | |
|---|---|---|---|
| 6,178,194 B1 * | 1/2001 | Vasic | H04L 1/06 375/136 |
| 8,345,547 B2 * | 1/2013 | Park | H04W 74/08 370/229 |
| 2007/0286122 A1 | 12/2007 | Fonseca | 370/329 |

(Continued)

OTHER PUBLICATIONS

International Search Report and Written Opinion of International Search Authority for PCT/US14/43744 dated Oct. 29, 2014(11 pages).

(Continued)

*Primary Examiner* — Ajay Cattungal
(74) *Attorney, Agent, or Firm* — Imperium Patent Works; Zheng Jin; Helen Mao

(57) ABSTRACT

A method of channel contention procedure with CCA level enhancement is proposed. A wireless device initiates an EDCA channel contention procedure to gain access to the wireless medium. The device determines an intended TX channel width and performs primary channel CCA using a set of CCA levels based on the intended TX channel width for determining channel idle or busy condition in the EDCA procedure. Upon gaining access, the device performs secondary channel CCA and thereby determining a final TX channel width. The device transmits radio signals using the final TX channel width and a TX spectral power density, which is adjusted to be corresponding to the intended TX channel width. By raising CCA levels to be based on the intended transmission channel width, the likelihood of wide channel width transmission is increased. As a result, significant network throughput increase can be accomplished in dense deployment scenarios.

24 Claims, 8 Drawing Sheets

ENHANCED CHANNEL ACCESS FOR WIDER TX CHANNEL WIDTH TRANSMISSION

(56) References Cited

U.S. PATENT DOCUMENTS

| | | | | |
|---|---|---|---|---|
| 2009/0323600 | A1 | 12/2009 | Chandra et al. | 370/329 |
| 2011/0116401 | A1* | 5/2011 | Banerjea | H04W 74/0816 |
| | | | | 370/252 |
| 2011/0164514 | A1 | 7/2011 | Afkhamie et al. | 370/252 |
| 2012/0213204 | A1* | 8/2012 | Noh | H04W 72/02 |
| | | | | 370/331 |
| 2012/0218983 | A1* | 8/2012 | Noh | H04B 7/0452 |
| | | | | 370/338 |
| 2012/0250532 | A1* | 10/2012 | Husted | H04W 74/0808 |
| | | | | 370/252 |
| 2013/0017794 | A1 | 1/2013 | Kloper et al. | 455/63.1 |
| 2014/0045514 | A1* | 2/2014 | Lee | H04W 16/14 |
| | | | | 455/454 |
| 2014/0050156 | A1* | 2/2014 | Chan | H04W 76/15 |
| | | | | 370/329 |
| 2016/0066349 | A1* | 3/2016 | Seok | H04W 24/02 |
| | | | | 370/338 |
| 2016/0081010 | A1* | 3/2016 | Seok | H04W 74/0816 |
| | | | | 370/329 |
| 2016/0105888 | A1* | 4/2016 | Seok | H04W 16/10 |
| | | | | 370/329 |
| 2017/0055288 | A1* | 2/2017 | Seok | H04W 72/04 |

OTHER PUBLICATIONS

EPO, Search Report for the EP patent application 14818206.6 dated Jun. 22, 2016 (9 pages).

IEEE 802.11ac: Dynamic Bandwidth Channel Access, Minyoung Park et al., ICC 2011-2011 IEEE International Conference on Communications, Jun. 5-9, 2011, Kyoto, Japan, IEEE, Piscataway, NJ. USA, Jun. 5, 2011.

\* cited by examiner

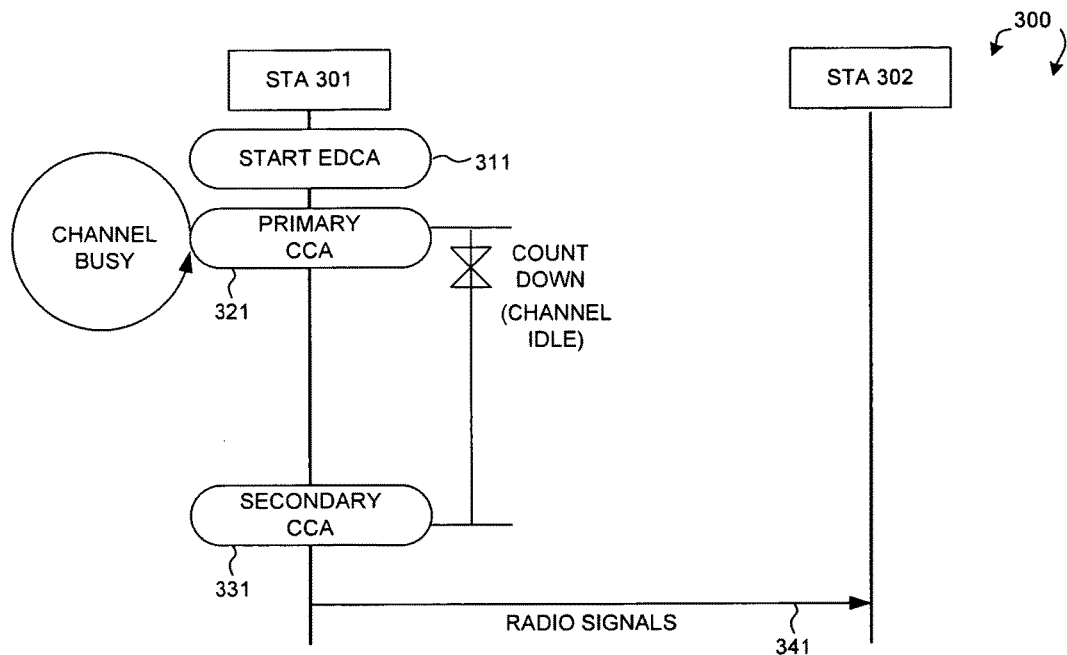

FIG. 3

| | |
|---|---|
| INTENDED TX CH BW | CCA LEVEL FOR 802.11ac |
| INTENDED 20 MHZ TX CH BW | FOR PRIMARY 20 MHZ: -82 dBm |
| INTENDED 40 MHZ TX CH BW | FOR PRIMARY 20 MHZ: -79 dBm<br>FOR 40 MHZ: -79 dBm |
| INTENDED 80 MHZ TX CH BW | FOR PRIMARY 20 MHZ: -76 dBm<br>FOR PRIMARY 40 MHZ: -76 dBm<br>FOR 80 MHZ: -76 dBm |
| INTENDED 160 MHZ TX CH BW | FOR PRIMARY 20 MHZ: -73 dBm<br>FOR PRIMARY 40 MHZ: -73 dBm<br>FOR PRIMARY 80 MHZ: -73 dBm<br>FOR 160 MHZ: -73 dBm |

| | |
|---|---|
| INTENDED TX CH BW | CCA LEVEL FOR 802.11ah |
| INTENDED 2MHZ TX CH BW | FOR PRIMARY 2 MHZ: -92 dBm |
| INTENDED 4 MHZ TX CH BW | FOR PRIMARY 2 MHZ: -89 dBm<br>FOR 4 MHZ: -89 dBm |
| INTENDED 8 MHZ TX CH BW | FOR PRIMARY 2 MHZ: -86 dBm<br>FOR PRIMARY 4 MHZ: -86 dBm<br>FOR 8 MHZ: -86 dBm |
| INTENDED 16 MHZ TX CH BW | FOR PRIMARY 2 MHZ: -83 dBm<br>FOR PRIMARY 4 MHZ: -83 dBm<br>FOR PRIMARY 8 MHZ: -83 dBm<br>FOR 16 MHZ: -83 dBm |

PRIMARY CHANNEL CCA

FIG. 4

| SECOND CHANNEL | CCA LEVEL |
|---|---|
| ANY SIGNAL WITHIN THE SECONDARY 20 MHZ | >= - 62 dBm |
| ANY SIGNAL WITHIN THE SECONDARY 40 MHZ | >= - 59 dBm |
| ANY SIGNAL WITHIN THE SECONDARY 80 MHZ | >= - 56 dBm |
| 80 MHZ NON-HT DUPLICATE OR VHT PPDU | >= - 69 dBm |
| 40 MHZ NON-HT DUPLICATE, HT_MF, HT_GF OR VHT PPDU | >= - 72 dBm |
| 20 MHZ NON_HT, HT_MF, HT_GF OR VHT PPDU | >= - 72 dBm |

SECONDARY CHANNEL CCA

DATA RATE VS SENSITIVITY FOR DIFFERENT CHANNEL WIDTHS

EDCA BASED ON BOTH 160MHZ AND 40MHZ TX CH WIDTHS

TRANSMIT POWER IMBALANCE

CCA LEVEL AND TRANSMIT POWER IMBALANCE

INCREASED NETWORK THROUGHPUT WITH CCA LEVEL ENHANCEMENT

CROSS REFERENCE TO RELATED APPLICATIONS

This application is filed under 35 U.S.C. § 111(a) and is based on and hereby claims priority under 35 U.S.C. § 120 and § 365(c) from International Application No. PCT/US14/43744, with an international filing date of Jun. 24, 2014, which in turn claims priority from U.S. Provisional Application No. 61/838,372 filed on Jun. 24, 2013, U.S. Provisional Application No. 61/845,700 filed on Jul. 12, 2013, and U.S. Provisional Application No. 61/846,123 filed on Jul. 15, 2013. This application is a continuation of International Application No. PCT/US14/43744, which claims priority from U.S. Provisional Application Nos. 61/838,372, 61/845,700, and 61/846,123. International Application No. PCT/US14/43744 is pending as of the filing date of this application, and the United States is a designated state in International Application No. PCT/US14/43744. This application claims the benefit under 35 U.S.C. § 119 from U.S. Provisional Application Nos. 61/838,372, 61/845,700, and 61/846,123. The disclosure of each of the foregoing documents is incorporated herein by reference. The disclosure of each of the foregoing documents is incorporated herein by reference.

TECHNICAL FIELD

The disclosed embodiments relate generally to wireless network communications, and, more particularly, to Clear Channel Assessment (CCA) level enhancement in wireless communications systems.

BACKGROUND

IEEE 802.11 is a set of media access control (MAC) and physical layer (PHY) specification for implementing wireless local area network (WLAN) communication, called WiFi, in the unlicensed (2.4, 3.6, 5, and 60 GHz) frequency bands. The standards and amendments provide the basis for wireless network products using the WiFi frequency bands. For example, IEEE 802.11ac is a wireless networking standard in the 802.11 family providing high-throughput WLANs on the 5 GHz band. Significant wider channel bandwidths (20 MHz, 40 MHz, 80 MHz, and 160 MHz) were proposed in the IEEE 802.11ac standard.

In IEEE 802.11ac, a transmitter of a BSS (basis service set) of certain bandwidth is allowed to transmit radio signals onto the shared wireless medium depending on clear channel assessment (CCA) sensing. For a BSS of certain bandwidth, a valid transmission sub-channel shall have bandwidth, allowable in the IEEE 802.11ac, equal to or smaller than the full bandwidth of the BSS and contains the designated primary sub-channel of the BSS. Based on the CCA sensing in the valid transmission bandwidths, the transmitter is allowed to transmit in any of the valid transmission sub-channels as long as the CCA indicates the sub-channel (or full channel) is idle. This dynamic transmission bandwidth scheme allows system bandwidth resource to be efficiently utilized.

An enhanced distributed channel access protocol (EDCA) is used in IEEE 802.11ac as a channel contention procedure for wireless devices to gain access to the shared wireless medium, e.g., to obtain a transmitting opportunity (TXOP) for transmitting radio signals onto the shared wireless medium. The simple CSMA/CA with random back-off contention scheme and low cost ad hoc deployment in unlicensed spectrum have contributed rapid adoption of WiFi systems. Typically, the EDCA TXOP is based solely on activity of the primary channel, while the transmit channel width determination is based on the secondary channel CCA during an interval (PIFS) immediately preceding the start of the TXOP. The basic assumption of EDCA is that a packet collision can occur if a device transmits signal under the channel busy condition when the received signal level is higher than CCA level.

In general, higher channel width transmission is both bandwidth and power efficient. First, in OFDM/OFDMA systems, higher number of subcarriers are achieved with reduced guard tones. Second, lower rate codes are more powerful than higher rate codes. Furthermore, higher channel width transmission causes less interference in dense deployment environment because the transmitting (TX) spectral density is lower. However, under the current EDCA channel contention procedure, the likelihood of higher channel width transmission is low.

This is because radio signal propagation range is determined by the TX spectral density and the channel propagation loss. Currently, the primary CCA levels are based on equal spectral density for all RX channel widths. For example, the CCA level/channel width (in unit of 20 MHz) is equal to −82 dBm for any 20 MHz, 40 MHz, 80 MHz, and 160 MHz RX channels. However, the TX spectral density is not the same for all TX channel widths. In general, the transmit power is nearly the same for all transmit channel widths, adjusted slightly based on peak average power ratio (PAPR) and/or EVM. The TX spectral density of a narrower TX channel therefore is higher than the TX spectral density of a wider TX channel, e.g., TX_PWR/20M>TX_PWR/40M>TX_PWR/80M>TX_PWR/160M. As a result, a narrower TX channel width transmission interferes (defers) a wider channel width transmission even though the wider channel width transmission might not cause interference to the narrower TX channel width transmission in the reciprocal direction. This is because the primary CCA level is set to fixed values regardless of what the transmit channel width is. Therefore, the likelihood of the wider channel transmission is reduced based on the current EDCA procedure.

Today, WiFi devices are over-populated. Dense deployment has led to significant issues such as interference, congestion, and low throughput. Raising CCA levels has been shown to increase spatial reuse, which leads to significant increase in the network throughput in dense deployment scenarios. However, raising CCA levels leads to high collision and starvation for legacy stations. A solution is sought to increase the likelihood of wider channel width transmission and to alleviate the above issues when raising the CCA levels and thereby increasing the network throughput.

SUMMARY

A method of channel contention procedure with CCA level enhancement is proposed. A wireless device initiates an EDCA channel contention procedure to gain access to the wireless medium. The device determines an intended TX channel width and performs primary channel CCA using a set of CCA levels based on the intended TX channel width for determining channel idle or busy condition in the EDCA procedure. Upon gaining access, the device performs secondary channel CCA and thereby determining a final TX channel width. The device transmits radio signals using the final TX channel width and a TX spectral power density, which is adjusted to be corresponding to the intended TX channel width. By raising CCA levels to be based on the intended transmission channel width, the likelihood of wide channel width transmission is increased. As a result, significant network throughput increase can be accomplished in dense deployment scenarios.

In IEEE 802.11ac systems, the current CCA levels are based on equal spectral power density for all receiving channel widths. For example, the CCA level/channel width (in unit of 20 MHz) is equal to −82 dBm for any 20 MHz, 40 MHz, 80 MHz, and 160 MHz RX channels. However, the TX spectral density is not the same for all TX channel widths. In general, the transmit power is nearly the same for all transmit channel widths, adjusted slightly based on peak average power ratio (PAPR) and/or EVM. The TX spectral density of a narrower TX channel therefore is higher than the TX spectral density of a wider TX channel, e.g., TX_PWR/20M>TX_PWR/40M>TX_PWR/80M>TX_PWR/160M. A narrower TX channel width transmission thus interferes (defers) a wider channel width transmission even though the wider channel width transmission might not cause interference to the narrower TX channel width transmission in the reciprocal direction. In one novel aspect, the set of primary channel CCA levels for a TX channel is based on the intended transmitting channel width instead of the receiving channel width. The wider the transmit channel width, the higher values of CCA levels are adopted which leads to high likelihood of channel idle conditions and higher probability of gain medium access. In addition, the same TX spectral power density as that of the intended transmitting channel width should be maintained if secondary channel is busy. Thus, transmission range can be maintained approximately the same for transmit channel width narrower than the intended transmitting channel width. As a result, the likelihood of wider channel width transmission is increased, and the transmission does not collide or interfere with other radio signals in the network.

In one embodiment, a reference spectral power density and a reference set of CCA levels for all devices are defined. If the transmit spectral power density exceeds the reference spectral power density by Δ, then the CCA should be lower than the same amount Δ from the reference CCA levels. Similarly, if the transmit spectral power density is lower than the reference spectral power density by Δ, then the CCA should be higher than the same amount Δ from the reference CCA levels.

In another embodiment, a novel channel access rule is applied. Each intended transmitting channel width has a reference transmitting spectral power density $PD_{intended\_TX\_BW}$. As long as the TX spectral power density of any actual final TX channel width is less than that of the reference transmitting spectral power density, then such transmission would limit the interference level to OBSS. In this method, the CCA levels are not necessary raised according to the intended transmitting channel width.

Other embodiments and advantages are described in the detailed description below. This summary does not purport to define the invention. The invention is defined by the claims.

BRIEF DESCRIPTION OF THE DRAWINGS

FIG. 3 illustrates a method flow of a wireless device obtaining EDCA TXOP and selecting TX channel width with CCA enhancement.

FIG. 4 illustrates a preferred embodiment of the novel primary channel CCA for IEEE 802.11ac systems and IEEE 802.11ah systems.

DETAILED DESCRIPTION

Reference will now be made in detail to some embodiments of the invention, examples of which are illustrated in the accompanying drawings.

Figure 1:
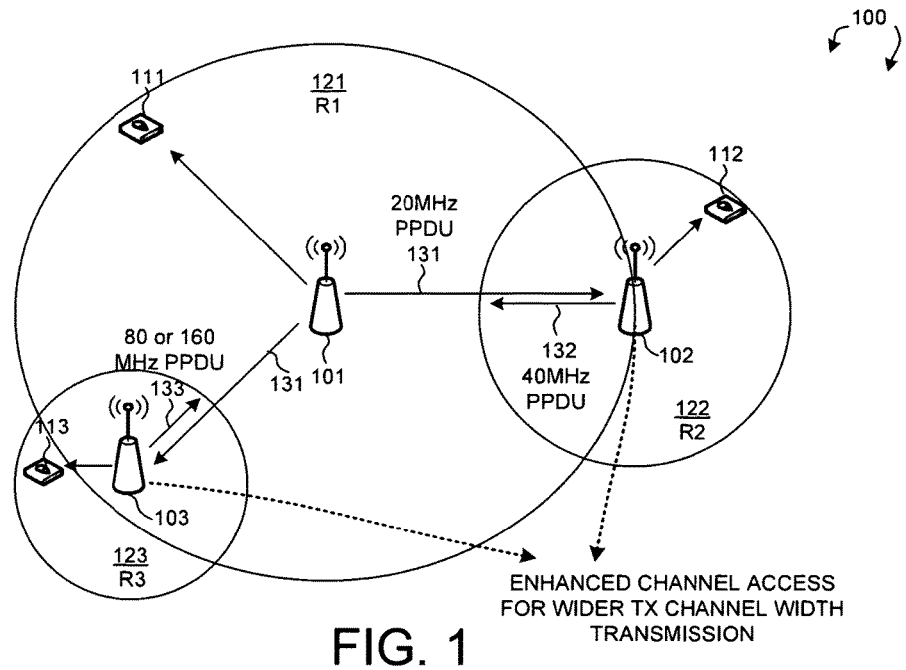
FIG. 1 illustrates a wireless network having overlapping BSS with different TX channel bandwidths in accordance with one novel aspect.

FIG. 1 illustrates a wireless network 100 having overlapping BSS (OBSS) with different TX channel bandwidths in accordance with one novel aspect. Wireless network 100 comprises a plurality of access points (APs) AP 101-AP 103 and a plurality of stations (STAs) STA 111-STA 113. In the example of FIG. 1, AP 101 transmits radio signals using a 20 MHz TX channel width. The 20 MHz PPDU 131 has a radio signal propagation coverage 121. AP 102 transmits radio signals using a 40 MHz TX channel width. The 40 MHz PPDU 132 has a radio signal propagation coverage 122. AP 103 transmits radio signals using an 80 MHz or 160 MHz TX channel width. The 80 MHz or 160 MHz PPDU 133 has a radio signal propagation coverage 123. Because the TX spectral density is not the same for all TX channel widths, i.e., TX_PWR/20M>TX_PWR/40M>TX_PWR/80M>TX_PWR/160M, it can be seen that the overlapping radio signal propagation coverage of 121, 122, and 123 have different radius. For example, radio signal propagation coverage 121 has a long radius R1, radio signal propagation coverage 122 has a medium radius R2, and radio signal propagation coverage 123 has a short radius R3. As a result, the 20 MHz PPDU 131 transmitted from AP 101 may interfere AP 102 and AP 103. On the other hand, the 40 MHz PPDU 132 transmitted from AP 102 and the 80 MHz or 160 MHz PPDU 133 transmitted from AP 103 do not interfere AP 101.

In IEEE 802.11 wireless networks, an enhanced distributed channel access protocol (EDCA) is used as a channel contention procedure for wireless devices to gain access to the shared wireless medium, e.g., to obtain a transmitting opportunity (TXOP) for transmitting radio signals onto the shared wireless medium. During the first stage of EDCA, the TXOP is obtained based solely on activity of the primary channel. The primary channel is BUSY of one of the predefined conditions is met based on Clear Channel Assessment (CCA) sensitivity levels. During the second stage of EDCA, the transmit channel width is selected based on the secondary channel CCA during an interval (PIFS) immediately preceding the start of TXOP. The secondary channel is BUSY if one of the predefined conditions is met based on CCA levels.

In general, higher channel width transmission is both bandwidth and power efficient. First, in OFDM/OFDMA systems, higher number of subcarriers are achieved with reduced guard tones. Second, lower rate codes are more powerful than higher rate codes. Furthermore, higher channel width transmission causes less interference in dense deployment environment because the transmitting (TX) spectral density is lower. However, the current CCA sensitivity levels are based on equal spectral density for all RX channel widths, which reduces the likelihood of higher channel width transmission. For example, the CCA level/channel width (in unit of 20 MHz) is equal to −82 dBm for any 20 MHz, 40 MHz, 80 MHz, and 160 MHz RX channels. However, the radio signal propagation of a narrower TX channel is larger than the radio signal propagation of a wider TX channel. As depicted in FIG. 1, a narrower 20 MHz TX channel transmission interferes (defers) a wider 40/80/160 MHz channel transmission even though the wider channel width transmission might not cause interference to the narrower TX channel width transmission in the reciprocal direction. As a result, the likelihood of the wider channel transmission is reduced based on the current CCA levels.

In one novel aspect, an enhanced channel access for wider TX channel width transmission is proposed. First, the primary CCA levels are based on the intended transmit channel width instead of the received channel width. As a result, the likelihood of the wider channel width transmission can be enhanced. Second, the transmit channel width selection and transmission rules are modified if higher CCA levels are used. More specifically, the same TX spectral power density, thus, the transmission radius, as that of the intended transmit channel width should be maintained if secondary channel is busy. As a result, the transmission does not collide or interfere with other radio signals in the network.

Figure 2:
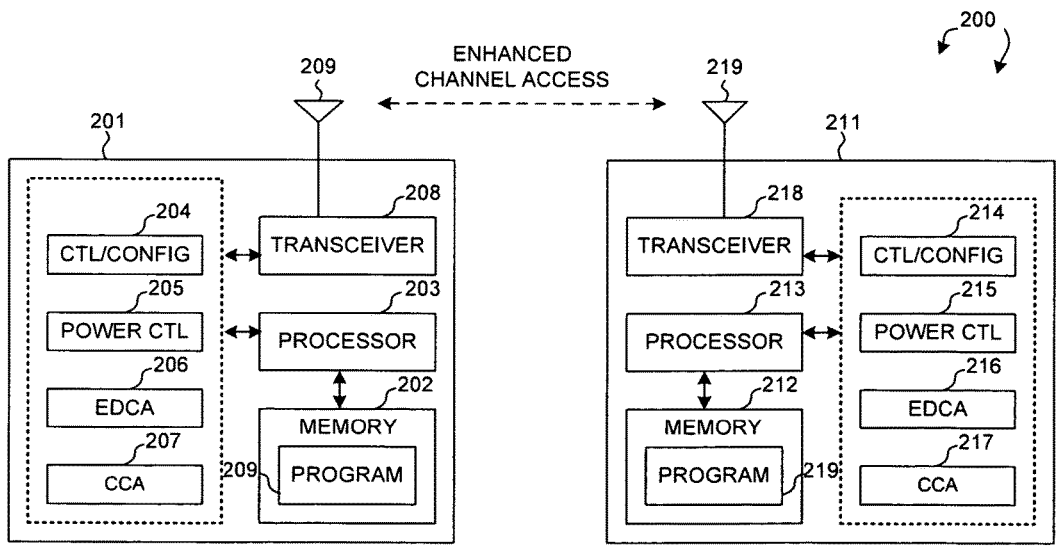
FIG. 2 is a simplified block diagram of a transmitting device and a receiving device in accordance with one novel aspect.

FIG. 2 is a simplified block diagram of a transmitting device 201 and a receiving device 211 in accordance with one novel aspect. Transmitting device 201 comprises memory 202, a processor 203, a control and configuration module 204, a power controller 205, an EDCA module 206, a CCA module 207, and a transceiver 208 coupled to antenna 209. Similarly, receiving device 211 comprises memory 212, a processor 213, a control and configuration module 214, a power controller 215, an EDCA module 216, a CCA module 217, and a transceiver 218 coupled to antenna 219. In the transmitting direction, the transceiver converts received baseband signals from the processor to RF signals and sends out to the antenna. In the receiving direction, the processor processes the received baseband signals from the transceiver and invoke different functional modules to perform various features supported by the wireless devices.

The different modules are functional modules that can be implemented in software, firmware, hardware, or any combination thereof. The function modules, when executed by processors 203 and 213 (via program instructions 209 and 219 contained in memory 202 and 212), interwork with each other to allow the wireless devices to perform enhanced channel access. For example, the EDCA module initiates a channel contention with random backoff procedure, the control and configuration module performs various control and configuration functionalities and determines an intended TX channel width, the CCA module performs primary channel CCA based on the intended TX channel width and also performs secondary channel CCA for TX channel width-selection, and the power control module controls the transmitting spectral power density based on the intended TX channel width.

FIG. 3 illustrates a method flow of a wireless device obtaining EDCA TXOP and selecting TX channel width with CCA enhancement in a wireless network 300. Wireless network 300 comprises a first station STA 301 and a second station STA 302. In Step 311, STA 301 initiates an EDCA channel contention procedure, which adopts simple CSMA/CA with random backoff contention scheme. In step 321, STA 301 starts a random count down counter and performs, CCA over the primary channel(s) of an intended TX channel width. For example, if the intended TX channel width is 80 MHz, then STA 301 needs to determine whether any of the primary 80 MHz, 40 MHz, and 20 MHz channels are busy based on the corresponding CCA levels. If so, then the primary channel is considered BUSY and STA 301 holds the counter. If not, then the primary channel is considered IDLE and STA 301 starts counter count down.

The current primary channel CCA sensitivity levels are based on equal spectral density for all RX channel widths. For example, the CCA level/channel width (in unit of 20 MHz) is equal to −82 dBm for any 20 MHz, 40 MHz, 80 MHz, and 160 MHz RX channels. As a result, the CCA levels are equal to −82 dBm, −79 dBm, −76 dBm, and −73 dBm for 20 MHz, 40 MHz, 80 MHz, and 160 MHz RX channel widths respectively, regardless of the intended TX channel width. In accordance with one novel aspect, to increase the likelihood of the wider channel width transmission, the primary channel CCA sensitivity levels are based on the intended TX channel width, instead of based on equal spectral density for all. RX channel widths.

Once STA 301 wins the medium contention and gains TXOP, in step 331, STA 301 starts to perform secondary channel CCA upon the random count down timer expires. The secondary channel CCA is performed during an interval (PIFS) immediately preceding the start of TXOP to select the actual TX channel width. For example, if the intended TX channel width is 80 MHz, then STA 301 needs to determine whether any of the secondary 40 MHz or 20 MHz channels are busy. If the secondary 40 MHZ channel is busy, then the actual TX channel width is reduced to 40 MHz. If the secondary 20 MHz is also busy, then the actual TX channel width is reduced to 20 MHz. Finally, in step 341, STA 301 transmits radio signals to other wireless devices using the selected actual TX channel width. In addition, in accordance with one novel aspect, STA 301 further determines the transmitting spectral power density based on the intended TX channel width, instead of the actual TX channel width, in order to reduce potential collision and interference with other radio signals.

FIG. 4 illustrates a preferred embodiment of the novel primary channel CCA for IEEE 802.11ac systems and IEEE 802.11ah systems. For the novel primary channel CCA, the set of CCA levels are based on the intended TX channel width. As illustrated in table 410 for IEEE 802.11ac systems, the intended TX channel widths are 20 MHz, 40 MHz, 80 MHz, and 160 MHz. If the intended TX channel width is 20

MHz, then the CCA level for the primary 20 MHz channel is −82 dBm. If the intended TX channel width is 40 MHz, then the CCA level for the primary 40 MHz channel is −79 dBm, and the CCA level for the primary 20 MHz channel is raised from −82 dBm to −79 dBm. If the intended TX channel width is 80 MHz, then the CCA level for the primary 80 MHz is −76 dBm, the CCA level for the primary 40 MHz channel is raised from −79 dBm to −76 dBm, and the CCA level for the primary 20 MHz channel is raised from −82 dBm to −76 dBm. If the intended TX channel width is 160 MHz, then the CCA level for the primary 160 MHz is −73 dBm, the CCA level for the primary 80 MHz is raised from −76 dBm to −73 dBm, the CCA level for the primary 40 MHz channel is raised from −79 dBm to −73 dBm, and the CCA level for the primary 20 MHz channel is raised from −82 dBm to −73 dBm. It can be seen that the set of CCA levels are tied to the intended TX channel width.

Similarly, as illustrated in table 420 for IEEE 802.11ah systems, the intended TX channel widths are 2 MHz, 4 MHz, 8 MHz, and 16 MHz. If the intended TX channel width is 2 MHz, then the CCA level for the primary 20 MHz channel is −92 dBm. If the intended TX channel width is 4 MHz, then the CCA level for the primary 4 MHz channel is −89 dBm, and the CCA level for the primary 2 MHz channel is raised from −92 dBm to −89 dBm. If the intended TX channel width is 8 MHz, then the CCA level for the primary 8 MHz is −86 dBm, the CCA level for the primary 4 MHz channel is raised from −89 dBm to −86 dBm, and the CCA level for the primary 2 MHz channel is raised from −92 dBm to −86 dBm. If the intended TX channel width is 16 MHz, then the CCA level for the primary 16 MHz is −83 dBm, the CCA level for the primary 8 MHz is raised from −86 dBm to −83 dBm, the CCA level for the primary 4 MHz channel is raised from −89 dBm to −83 dBm, and the CCA level for the primary 2 MHz channel is raised from −92 dBm to −83 dBm. It can be seen that the set of CCA levels are tied to the intended TX channel width.

Figures 5, 6:
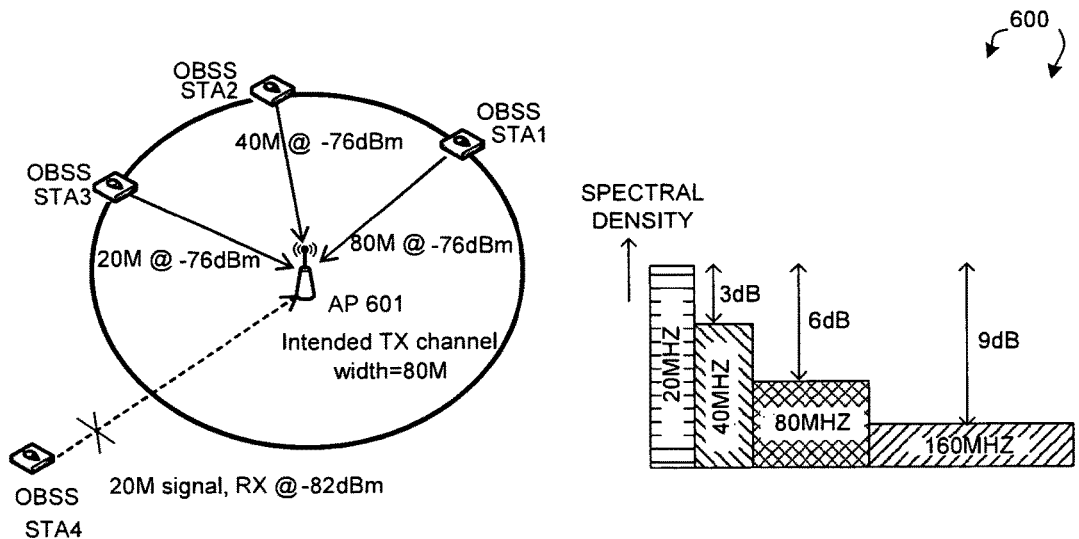
FIG. 5 illustrates secondary channel CCA in IEEE 802.11ac systems.
FIG. 6 illustrates the novel primary CCA levels for an intended 80 MHz TX channel width.

FIG. 5 illustrates secondary channel CCA in IEEE 802.11ac systems. As illustrated in table 510, the CCA level for any non-WiFi signals in secondary 20 MHz channel is −62 dBm, the CCA level any non-WiFi signals for secondary 40 MHz channel is −59 dBm, the CCA level any non-WiFi signals for secondary 80 MHz channel is −56 dBm, the CCA level 80 MHz non-HT duplicate or VHT PPDU is −69 dBm, the CCA level 40 MHz non-HT duplicate, HT_MF, HT_GF, or VHT PPDU is −72 dBm, and the CCA level 20 MHz non-HT, HT_MF, HT_GF, or VHT PPDU is also −72 dBm. The actual TX channel width is determined based on the secondary channel CCA. Under the same principle as the primary channel CCA, the set of secondary channel CCA levels may also be raised to increase the transmitting opportunity.

FIG. 6 illustrates the novel primary CCA levels for an intended transmitting channel width of 80 MHz in a wireless network 600. Wireless network 600 comprises an access point AP 601, and a plurality of stations STA1, STA2, STA3, and STA4. In the example of FIG. 6, AP 601 initiates an EDCA channel contention procedure, determines an intended TX channel width of 80 MHz, and performs primary channel CCA accordingly. For an intended 80 MHz PPDU transmission, AP 601 needs to determine whether any of the 80 MHz, the primary 40 MHz, and the primary 20 MHz channels are busy or idle. Considering STA1 transmitting 80 MHz PPDU, the primary 80 MHz channel is considered busy if the received radio signal strength of the start of an 80 MHz PPDU in the primary 80 MHz channel is at or above −76 dBm. Next, considering STA2 transmitting 40 MHz PPDU, the primary 40 MHz channel is considered busy if the received radio signal strength of the start of a 40 MHz PPDU in the primary 40 MHz channel is at or above −76 dBm (the same CCA level as the 80 MHz channel). Next, considering STA3 transmitting 20 MHz PPDU, the primary 20 MHz channel is considered busy if the radio signal strength of the start of a 20 MHz PPDU in the primary 20 MHz channel is at or above −76 dBm CCA level (the same CCA level as the 80 MHz channel).

It can be seen that the CCA levels for the primary 80 MHz, 40 MHz, and 20 MHz channels are all tied to the intended TX channel width of 80 MHz. This is contrary to the traditional EDCA procedure, where the CCA levels are based on the equal spectral density for all RX channel widths. For example, considering STA4 transmitting-a 20 MHz PPDU, the traditional CCA level is −82 dBm, which means that the 20 MHz channel is considered busy if the received radio signal strength of the start of a 20 MHz PPDU in the primary 20 MHz is at or above −82 dBm. However, although the radio signals from STA4 would have interfered with AP 601, the radio signals from AP 601 would not have reached STA4, because AP 601 is intending to transmit at a higher TX channel width using a lower spectral density, e.g., the spectral power density of 80 MHz PPDU transmission is 6 dB lower than the spectral power density of 20 MHz PPDU transmission. It is thus unnecessary to trigger CCA busy using the lower CCA level of −82 dBm corresponding to the 20 MHz RX channel when a higher TX channel width of 80 MHz is intended. In one novel aspect, the CCA level is raised from −82 dBm to −76 dBm (6 dB higher than −82 dBm, which is the traditional CCA level), corresponds to the intended TX channel width of 80 MHz. As a result, by raising the CCA levels to be based on the intended TX channel width, the enhanced primary channel CCA increases the likelihood of higher TX channel width transmission, which is both bandwidth and power efficient, and causes less interference in dense deployment environment.

Figure 7:
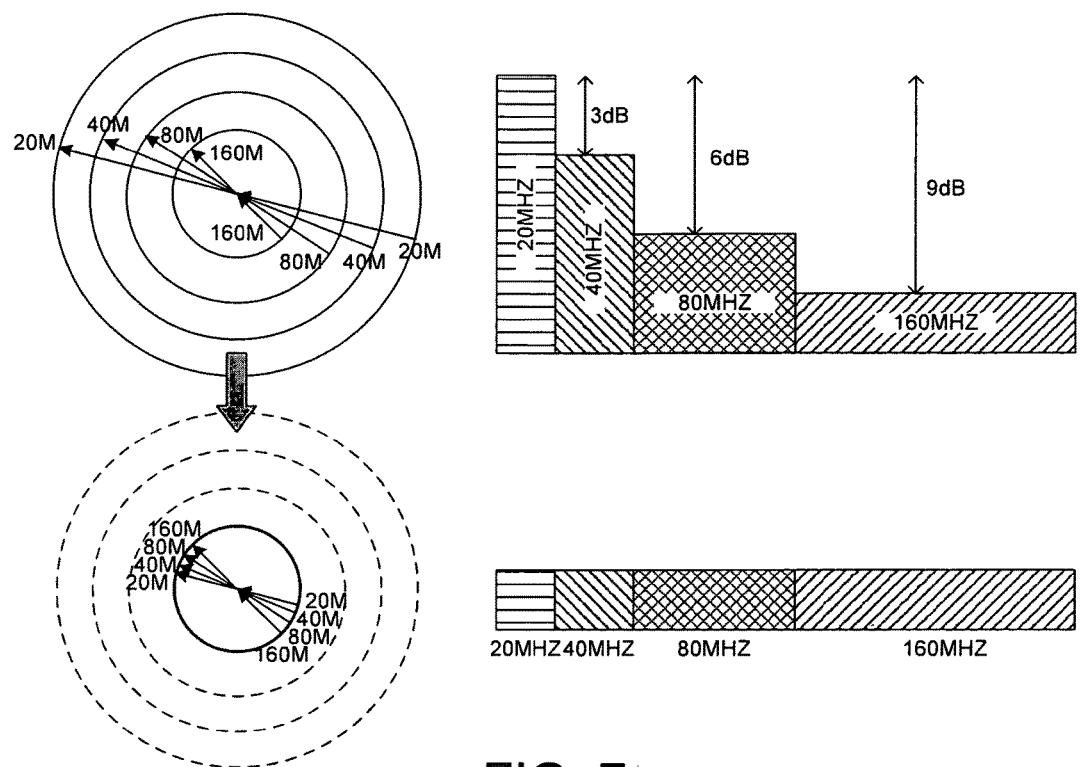
FIG. 7 illustrates the novel primary CCA levels and TX channel width selection and TX spectral power density for an intended 160 MHz TX channel width.

FIG. 7 illustrates the novel primary CCA levels and TX channel width selection and TX power spectral density for an intended 160 MHz TX channel. The top half of FIG. 7 depicts the traditional primary CCA levels for different channel widths and corresponding spectral density. The bottom half of FIG. 7 depicts the raised primary CCA levels for intended TX channel width and corresponding spectral density. If the new raised set of CCA levels are based on the intended TX channel widths, then corresponding new channel access rules are needed. More specifically, if any of the secondary channel CCA is busy and the actual TX channel width is reduced as compared to the original intended TX channel width, then the transmitting spectral power density is based on the original intended TX channel width, instead of the actual TX channel width, in order to reduce collision and interference with other radio signals. In other words, the same TX power density for the intended 160 MHz channel should be maintained even if the actual TX channel width is reduced to be 80/40/20 MHz.

Suppose that the intended TX channel width is 160 MHz or 80+80 MHz, and that an STA has a transmit power spectral density of $PD_{160M}$. If the STA is permitted to begin a TXOP and the STA has at least one MSDU pending for transmission of the permitted TXOP, then the STA shall perform exactly one of the following steps: a) Transmit a 160 MHz or 80+80 MHz mask PPDU at $PD_{160m}$ if the secondary channel, the secondary 40 MHz channel and the secondary 80 MHz channel were idle during an interval of PIFS immediately preceding the start of the TXOP; b) Transmit an 80 MHz mask PPDU at a power spectral density ≤$PD_{160M}$ on the primary 80 MHz channel if the secondary channel and the secondary 40 MHz channel were idle during an interval of PIFS immediately preceding the start of the TXOP; c) Transmit a 40 MHz mask PPDU at a power spectral density ≤$PD_{160M}$ on the primary 40 MHz channel if the secondary channel was idle during an interval of PIFS immediately preceding the start of the TXOP; d) Transmit a 20 MHz mask PPDU at a power spectral density ≤$PD_{160M}$ on the primary 20 MHz channel; and e) Restart the channel access attempt by invoking the backoff procedure as though the medium is busy on the primary channel as indicated by either physical or virtual CS and the backoff timer has value of 0.

Figure 8:
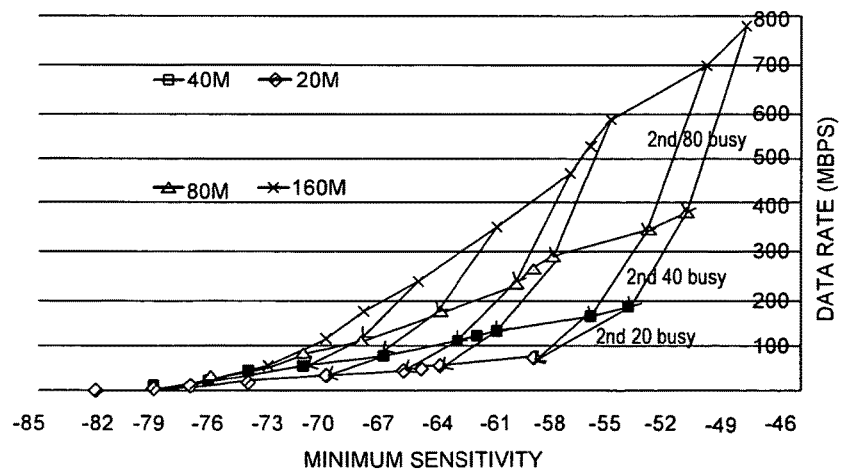
FIG. 8 illustrates EDCA transmission performance with enhanced CCA based on 160 MHz intended TX channel width.

FIG. 8 illustrates a EDCA transmission performance with enhanced CCA based on 160 MHz intended TX channel width based on minimum received sensitivity level of the different modulation and coding scheme (MCS) and the corresponding highest data rate in each of the transmit channel width from the 802.11ac standard. In the example of FIG. 8, the EDCA transmission has CCA levels based on the intended TX channel width of 160 MHz, which is 9 dB above the current CCA level for 20 MHz channel. The 160 MHz TX channel width transmission produces the highest data rate. If the secondary 80 MHz channel is busy, then it falls back to 80 MHz PPDU transmission over the primary 80 MHz channel. If the secondary 40 MHz channel is busy, then it falls back to 40 MHz PPDU transmission over the primary 40 MHz channel. If the secondary 20 MHz channel is busy, then it falls back to 20 MHz PPDU transmission over the primary 20 MHz channel. As the TX channel width reduces, the data rate also decreases accordingly.

Figure 9:
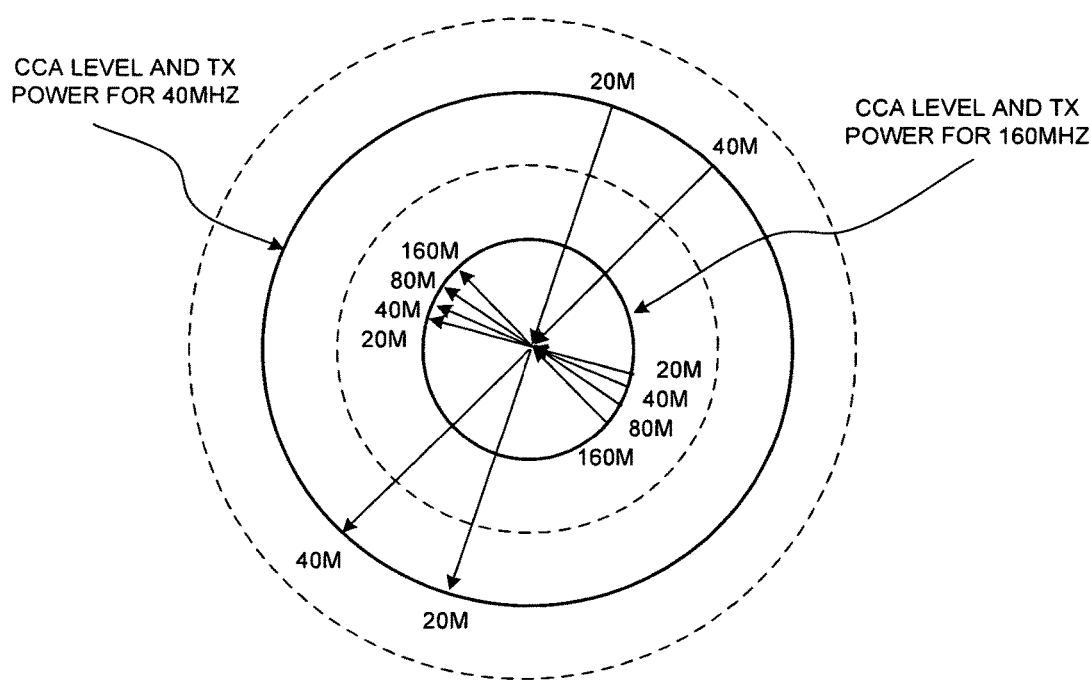
FIG. 9 illustrates an EDCA procedure with two different intended TX channel widths.

FIG. 9 illustrates two EDCA procedures with two different intended TX channel widths. In the example of FIG. 9, two simultaneous EDCA back-off procedures are started by an STA. Each EDCA procedure is associated with an intended channel width and corresponding CCA levels. A first EDCA procedure has an intended TX channel width of 40 MHz, and a second EDCA procedure has an intended TX channel width of 160 MHz. The two different intended TX channel widths are determined based on desired transmission distance and/or bandwidth. By starting two simultaneous EDCA procedures, the probability of gaining a transmitting opportunity is increased. If the STA wins the medium contention for intended 40 MHz TX channel width, it transmits radio signals at a power spectral density ≤$PD_{40M}$ on the primary 40 MHz or 20 MHz channel. Similarly, if the STA wins the medium contention for intended 160 MHz TX channel width, it transmits radio signals at a power spectral density ≤$PD_{160M}$ on the primary 160 MHz or the primary 80/40/20 MHz channel.

Figure 10:
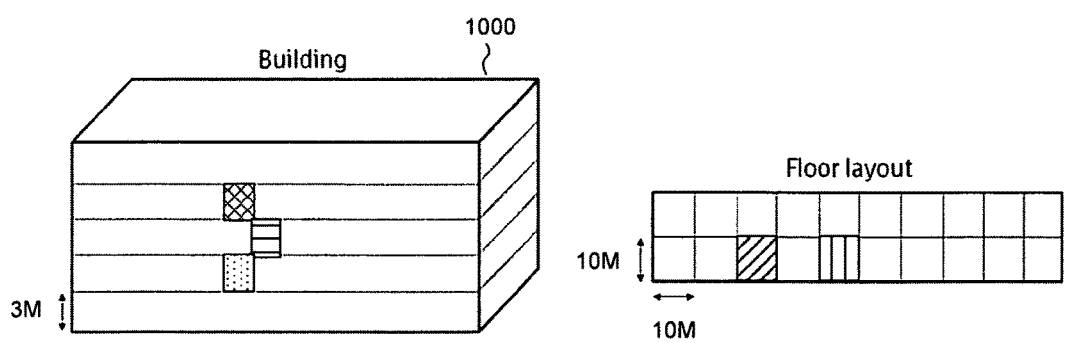
FIG. 10 shows an example of CCA enhancement applied in an apartment building with dense deployment scenario.

FIG. 10 shows an example of CCA enhancement applied in an apartment building 1000 with dense deployment scenario. In the apartment building, the propagation loss for two units away is 94 dB (2 walls, minimum distance=10 m), the propagation loss for two floors away is 100 dB (2 floors, average distance=3 m), and the propagation loss for one floor and one unit away is 94.7 dB (1 wall and one floor, average distance=5.8 m). With TX power of 21 dBm and intended 160 MHz TX channel width is used, the received radio signal strength from immediate neighbor units is −73 dB (i.e., 21 dB-94 dB=−73 dB). Since the CCA levels are −73 dBm, only the immediate neighbor units and the units above or below will trigger 160 MHz CCA levels. As the compared to the traditional CCA levels, the number of apartment units within CCA is reduced from 24 to seven units. As a result, the likelihood of 160 MHz TX channel width transmission is largely increased.

Another similar scenario that may create collision is the transmit power imbalance between two devices both using the same CCA levels. When two devices with different transmit powers but the same transmit channel width, it may happen that the transmission of the high power device triggers CCA channel busy condition (i.e., the received radio signal strength above the CCA level) at the low power device, whereas the transmission of the low power device does not trigger CCA channel busy condition at the high power device. If both devices use the same CCA levels, then the high power device interferes (defers) transmission of the low power device.

Figure 11:
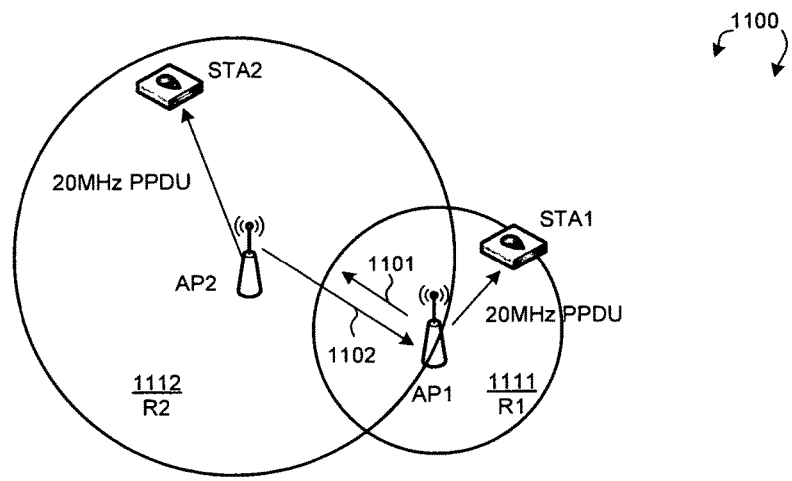
FIG. 11 illustrates transmitting power imbalance in a wireless network.

FIG. 11 illustrates transmitting power imbalance in a wireless network 1100. Wireless network 1100 comprises two access points AP1 and AP2, and two stations STA1 and STA2. In the example of FIG. 11, AP1 transmits a 20 MHz PPDU 1101 with a low transmit power, while AP2 transmits a 20 MHz PPDU 1102 with a high transmit power. The radio signal propagation of PPDU 1101 has a smaller coverage 1111 with radius R1, and the radio signal propagation of PPDU 1102 has a larger coverage 1112 with radius R2. As a result, the transmission of PPDU 1102 would trigger CCA channel busy condition at AP1, while the transmission of PPDU 1101 may not trigger CCA channel busy condition at AP2 if the same CCA sensitivity levels are used by AP1 and AP2. In one novel aspect, such power imbalance issue may be solved by having the high transmission power device (AP2) using a set of lower CCA levels and the low transmission power device (AP1) using a set of high CCA levels.

Figure 12:
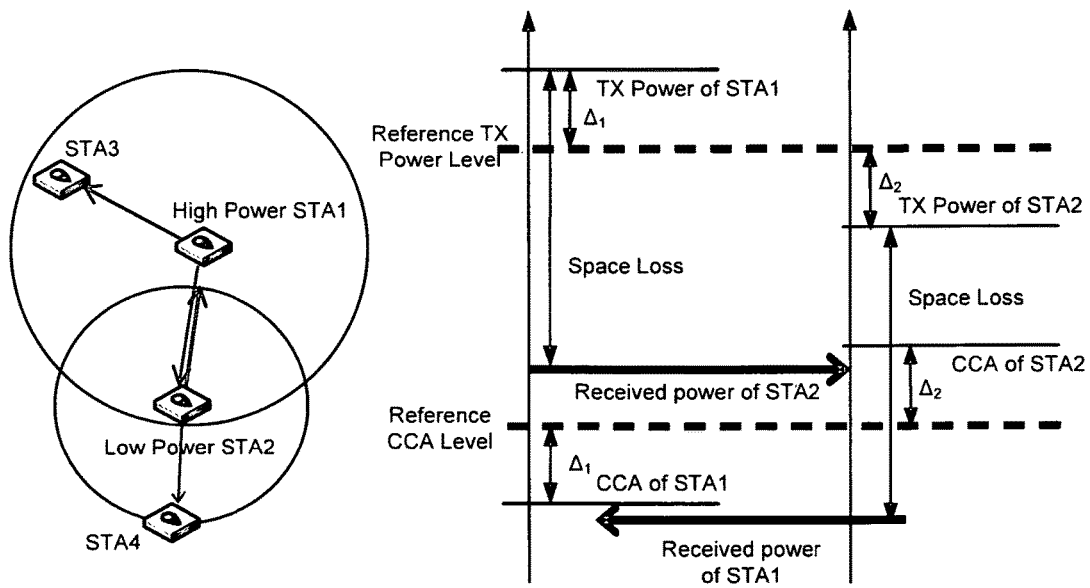
FIG. 12 illustrates one embodiment of CCA level adjustment under transmitting power imbalance.

FIG. 12 illustrates one embodiment of CCA level adjustment under transmitting power imbalance. In this preferred embodiment, a reference TX power level and a set of reference CCA levels corresponding to different channel widths are defined for all STAs. In the example of FIG. 12, STA1 is a high power station and STA 2 is a low power station. Suppose STA1 and STA2 are using the same transmit channel width, which has a reference TX power level and a corresponding reference CCA level. If the transmitting power of STA1 exceeds the reference TX power level by $\Delta_1$, then its corresponding set of CCA levels should be lower than the same amount $\Delta_1$ from the reference CCA level. Similarly, if the transmitting power of STA2 is below the reference TX power level by $\Delta_2$, then its corresponding set of CCA levels should be higher than the same amount $\Delta_2$ from the reference CCA level.

In the case of two devices with different transmit powers but also different transmit channel widths, the transmitting spectral power density should be the parameter to use based on the intended transmit channel width. Since high spectral power density device can interfere with farther devices, it needs to sense channel with low CCA levels. On the other hand, since low spectral power density device only interfere with closer devices, it may sense channel with high CCA levels. In one preferred embodiment, a reference spectral power density and a reference set of CCA levels for all devices are defined. If the transmit spectral power density exceeds the reference spectral power density by $\Delta$, then the CCA should be lower than the same amount $\Delta$ from the reference CCA levels. Similarly, if the transmit spectral power density is lower than the reference spectral power density by $\Delta$, then the CCA should be higher than the same amount $\Delta$ from the reference CCA levels.

Figure 13:
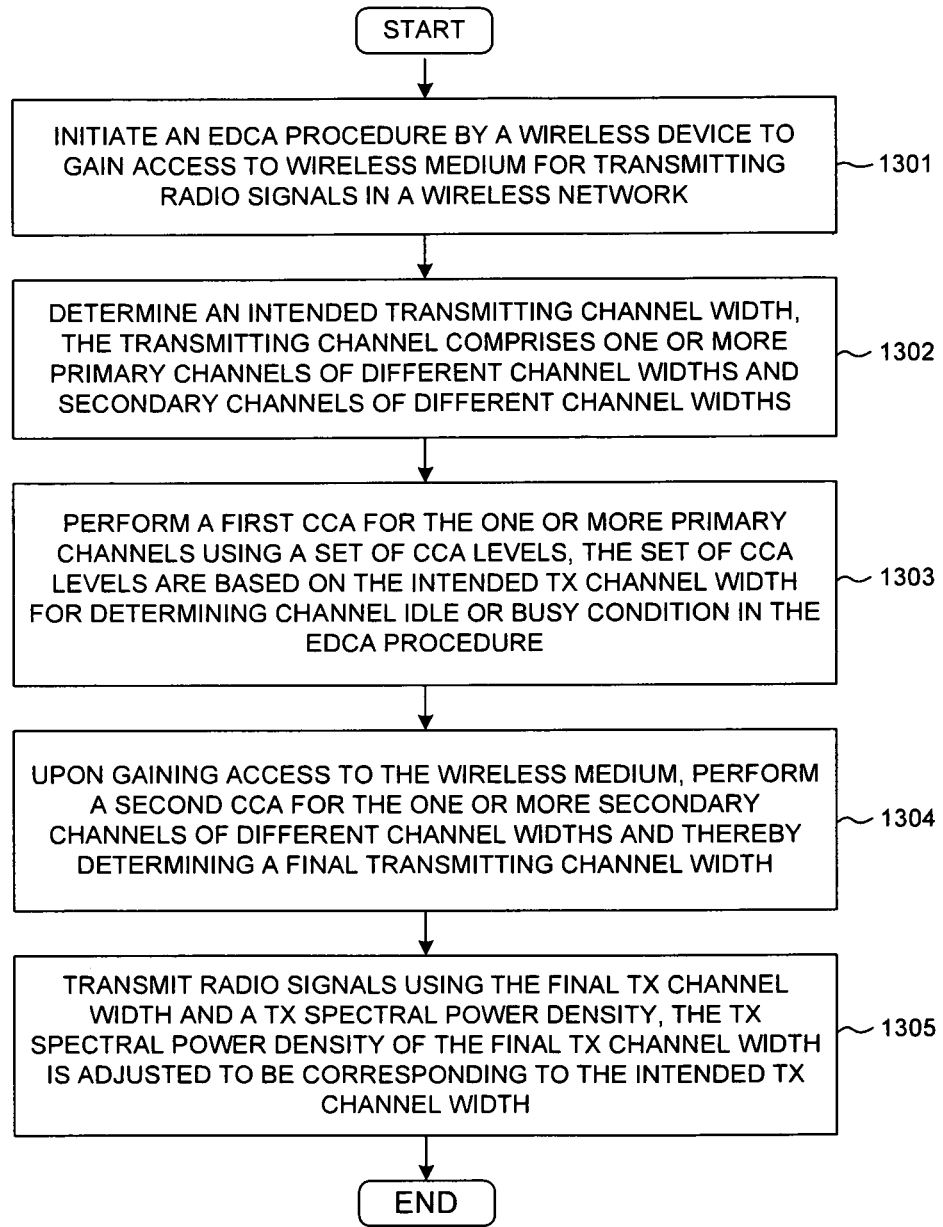
FIG. 13 is a flow chart of a method of CCA level enhancement in a wireless communication system in accordance with one novel aspect.

FIG. 13 is a flow chart of a method of CCA level enhancement in a wireless communication system in accordance with one novel aspect. In step 1301, a wireless device initiates an EDCA channel contention procedure to gain access to the wireless medium, e.g., obtaining a TXOP for transmitting radio signals. In step 1302, the wireless device determines an intended transmitting (TX) channel width. The TX channel comprises one or more primary channels and secondary channels of different channel widths. For example, an 80 MHz TX channel comprises 80/40/20 MHz primary and secondary channels. In step 1303, the wireless device performs a first CCA for the one or more primary channels using a set of CCA levels that are based on the intended TX channel width, for determining channel idle or busy condition in the EDCA procedure. In step 1304, upon gaining access to the wireless medium, the wireless device performs a second CCA for the one or more secondary channels and thereby determining a final transmitting channel width. In step 1305, the wireless device transmits radio signals using the final transmitting channel width and a transmitting spectral power density. The TX spectral power density of the final TX channel width is adjusted to be corresponding to the intended TX channel width. Significant network throughput increase can be accomplished in dense deployment scenarios due to 1) higher CCA levels based on the intended transmission channel width increase the likelihood of wide channel width transmission, and 2) wider channel width transmission is more bandwidth and power efficient due to more powerful low rate codes and less guard tones.

In accordance with one novel aspect, an intended transmitting channel width has a reference transmitting spectral power density $PD_{intended\_TX\_BW}$. As long as the TX spectral power density of any actual final TX channel width is less than that of the reference transmitting spectral power density, then such transmission would limit the interference level to OBSS. In this method, the CCA levels are not necessary raised according to the intended transmitting channel width.

In one example, suppose that the intended TX channel width is 80 MHz, and that an STA has a reference transmit power spectral density of $PD_{intended\_TX\_BW}=PD_{80M}$. If the STA is permitted to begin a TXOP and the STA has at least one MSDU pending for transmission of the permitted TXOP, then the STA shall perform exactly one of the following steps: a) Transmit a 160 MHz or 80+80 MHz mask PPDU if the secondary channel, the secondary 40 MHz channel and the secondary 80 MHz channel were idle during an interval of PIFS immediately preceding the start of the TXOP; b) Transmit an 80 MHz mask PPDU at a power spectral density $PD_{80M}$ on the primary 80 MHz channel if the secondary channel and the secondary 40 MHz channel were idle during an interval of PIFS immediately preceding the start of the TXOP; c) Transmit a 40 MHz mask PPDU at a power spectral density $\leq PD_{80M}$ on the primary 40 MHz channel if the secondary channel was idle during an interval of PIFS immediately preceding the start of the TXOP; d) Transmit a 20 MHz mask PPDU at a power spectral density $\leq PD_{80M}$ on the primary 20 MHz channel; and e) Restart the channel access attempt by invoking the backoff procedure as though the medium is busy on the primary channel as indicated by either physical or virtual CS and the backoff timer has value of 0.

In another example, suppose that the intended TX channel width is 160 MHz or 80+80 MHz, and that an STA has a reference transmit power spectral density of $PD_{intended\_TX\_BW}=PD_{160M}$. If the STA is permitted to begin a TXOP and the STA has at least one MSDU pending for transmission of the permitted TXOP, then the STA shall perform exactly one of the following steps: a) Transmit a 160 MHz or 80+80 MHz mask PPDU at $PD_{160M}$ if the secondary channel, the secondary 40 MHz channel and the secondary 80 MHz channel were idle during an interval of PIFS immediately preceding the start of the TXOP; b) Transmit an 80 MHz mask PPDU at a power spectral density $\leq PD_{160M}$ on the primary 80 MHz channel if the secondary channel and the secondary 40 MHz channel were idle during an interval of PIFS immediately preceding the start of the TXOP; c) Transmit a 40 MHz mask PPDU at a power spectral density $\leq PD_{160M}$ on the primary 40 MHz channel if the secondary channel was idle during an interval of PIFS immediately preceding the start of the TXOP; d) Transmit a 20 MHz mask PPDU at a power spectral density $\leq PD_{160M}$ on the primary 20 MHz channel; and e) Restart the channel access attempt by invoking the backoff procedure as though the medium is busy on the primary channel as indicated by either physical or virtual CS and the backoff timer has value of 0.

Figure 14:
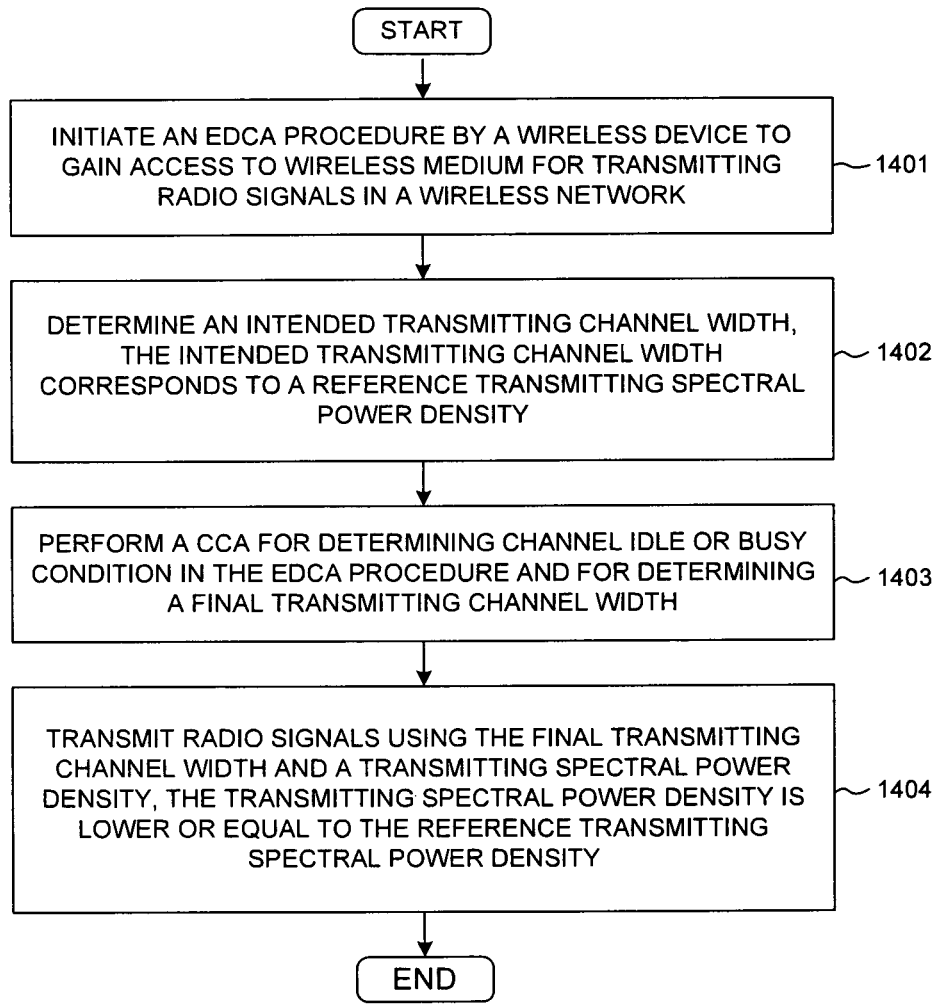
FIG. 14 is a flow chart of a method of channel access in a wireless communication system in accordance with one novel aspect.

FIG. 14 is a flow chart of a method of channel access procedure in a wireless communication system in accordance with one novel aspect. In step 1401, a wireless device initiates an EDCA channel contention procedure to gain access to the wireless medium, e.g., obtaining a TXOP for transmitting radio signals. In step 1402, the wireless device determines an intended transmitting (TX) channel width. The TX channel comprises one or more primary channels and secondary channels of different channel widths. For example, an 80 MHz TX channel comprises 80/40/20 MHz primary and secondary channels. The intended TX channel width corresponds to a reference TX spectral power density. In step 1403, the wireless devices performs CCA for determining channel idle or busy condition in the EDCA procedure and for determining a final TX channel width. In step 1404, the wireless device transmits radio signals using the final transmitting channel width and a transmitting spectral power density. The TX spectral power density is lower or equal to the reference TX spectral power density.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   initiating an enhanced distributed channel access (EDCA) procedure by a wireless device to gain access to wireless medium for transmitting radio signals in a wireless network;
   determining an intended transmitting channel width, wherein the transmitting channel comprises one or more primary channels of different channel widths and secondary channels of different channel widths; and
   performing a clear channel assessment (CCA) for the one or more primary channels using a set of pre-determined primary channel CCA levels, wherein the set of pre-determined primary channel CCA levels is based on the intended transmitting channel width instead of corresponding receiving channel widths for determining channel idle or busy condition in the EDCA procedure.

2. The method of claim 1, further comprising:
   upon gaining access to the wireless medium, performing a secondary channel CCA for the one or more secondary channels of different channel widths and thereby determining a final transmitting channel width; and
   transmitting radio signals using the final transmitting channel width and a transmitting spectral power density, wherein the transmitting spectral power density of the final transmitting channel width is adjusted to be corresponding to the intended transmitting channel width.

3. The method of claim 2, wherein a first narrower transmitting channel width corresponds to a first lower transmitting power, and wherein a second wider transmitting channel width corresponds to a second higher transmitting power such that the transmit spectral power density is determined from the intended transmit channel width.

4. The method of claim 3, wherein the transmitting power of the final transmitting channel width is adjusted to be corresponding to the intended transmitting channel width to reduce collision.

5. The method of claim 1, further comprising:
upon gaining access to the wireless medium, performing a secondary channel CCA for the one or more secondary channels of different channel widths and thereby determining a final transmitting channel width, wherein a set of secondary channel CCA levels is based on the intended transmitting channel width.

6. The method of claim 5, wherein the set of secondary channel CCA levels is raised to increase a probability of transmission.

7. The method of claim 1, wherein a first set of primary channel CCA levels of a first wider intended transmitting channel width is higher than or equal to a second set of primary channel CCA levels of a second narrower intended transmitting channel width.

8. The method of claim 7, wherein the first set of primary channel CCA levels is raised to increase a probability of gaining a transmitting opportunity for the first wider intended transmitting channel.

9. The method of claim 1, further comprising:
determining a second intended transmitting channel width and performing corresponding EDCA and CCAs to increase a probability of gaining a transmitting opportunity.

10. The method of claim 9, wherein the second intended transmitting channel width is determined based on a desired transmitting distance or bandwidth.

11. The method of claim 1, further comprising:
obtaining a reference transmitting spectral power density and a set of reference CCA levels corresponding to different channel widths, wherein each CCA level for a channel width is adjusted based on the reference CCA level according to a difference between an actual transmitting spectral power density and the reference transmitting spectral power density.

12. The method of claim 11, wherein the CCA level is increased to be higher than the reference CCA level if the actual transmitting spectral power density is lower than the reference transmitting spectral power density.

13. The method of claim 11, wherein the CCA level is decreased to be lower than the reference CCA level if the actual transmitting spectral power density is higher than the reference transmitting spectral power density.

14. A device comprising:
an enhanced distributed channel access (EDCA) module that initiates an EDCA channel contention procedure to gain access to wireless medium for transmitting radio signals;
a control module that determines an intended transmitting channel width in a wireless network, wherein the transmitting channel comprises one or more primary channels of different channel widths and secondary channels of different channel widths; and
a clear channel assessment (CCA) module that performs a CCA for the one or more primary channels using a set of pre-determined primary channel CCA levels, wherein the set of pre-determined primary channel CCA levels is based on the intended transmitting channel width instead of corresponding receiving channel width for determining channel busy or idle condition in the EDCA channel contention procedure.

15. The device of claim 14, wherein the CCA module also performs a secondary channel CCA for the one or more secondary channels and thereby determining a final transmitting channel width, the device further comprises:
a transmitter that transmits radio signals using the final transmitting channel width and a transmitting spectral power density, wherein the transmitting spectral power density of the final transmitting channel width is adjusted to be corresponding to the intended transmitting channel width.

16. The device of claim 15, wherein a first narrower transmitting channel width corresponds to a first lower transmitting power, and wherein a second wider transmitting channel width corresponds to a second higher transmitting power such that the transmit spectral power density is determined from the intended transmit channel width.

17. The device of claim 14, wherein the CCA module also performs a secondary channel CCA for the one or more secondary channels and thereby determining a final transmitting channel width, and wherein a set of secondary channel CCA levels is based on the intended transmitting channel width.

18. The device of claim 14, wherein a first set of primary channel CCA levels of a first wider intended transmitting channel width is higher than a second set of primary channel CCA levels of a second narrower intended transmitting channel width.

19. The device of claim 14, wherein the channel access module determines a second intended transmitting channel width and performing corresponding CCAs to increase a probability of gaining a transmitting opportunity.

20. The device of claim 14, further comprising:
a configuration module that obtains a reference transmitting spectral power density and a reference set of CCA levels corresponding to different channel widths, wherein each CCA level of a channel width is adjusted based on the reference CCA level according to a difference between an actual transmitting spectral power density and the reference transmitting spectral power density.

21. The device of claim 20, wherein the CCA level is increased to be higher than the reference CCA level if the actual transmitting spectral power density is lower than the reference transmitting spectral power density.

22. The device of claim 20, wherein the CCA level is decreased to be lower than the reference CCA level if the actual transmitting spectral power density is higher than the reference transmitting spectral power density.

23. A method, comprising:
initiating an enhanced distributed channel access (EDCA) procedure by a wireless device to gain access to wireless medium for transmitting radio signals in a wireless network;
determining an intended transmitting channel width, wherein the intended transmitting channel width corresponds to a reference transmitting spectral power density;

performing a clear channel assessment (CCA) for determining channel idle or busy condition in the EDCA procedure and for determining a final transmitting channel width; and transmitting radio signals using the final transmitting channel width and a transmitting spectral power density, wherein the transmitting spectral power density is lower or equal to the reference transmitting spectral power density.

24. The method of claim 23, wherein the transmitting power of the final transmitting channel width is adjusted to be corresponding to the intended transmitting channel width to reduce interference.

\* \* \* \* \*